US011468700B2

(12) United States Patent
Lee et al.

(10) Patent No.: US 11,468,700 B2
(45) Date of Patent: Oct. 11, 2022

(54) ELECTRONIC DEVICE INCLUDING DISPLAY MODULE INCLUDING SENSOR AND METHOD FOR MANUFACTURING THE DISPLAY MODULE

(71) Applicant: Samsung Electronics Co., Ltd., Gyeonggi-do (KR)

(72) Inventors: Yongwon Lee, Gyeonggi-do (KR); Il Kim, Gyeonggi-do (KR); Dareum Kang, Gyeonggi-do (KR); Chohee Park, Gyeonggi-do (KR); Dohyun Bae, Gyeonggi-do (KR); Hyeoncheol Jeong, Gyeonggi-do (KR); Jeonggyu Jo, Gyeonggi-do (KR); Seongwoo Choi, Gyeonggi-do (KR); Bongjae Rhee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 229 days.

(21) Appl. No.: 16/791,404

(22) Filed: Feb. 14, 2020

(65) Prior Publication Data

US 2020/0265204 A1 Aug. 20, 2020

(30) Foreign Application Priority Data

Feb. 15, 2019 (KR) ........................ 10-2019-0018070
Feb. 19, 2019 (KR) ........................ 10-2019-0019472

(51) Int. Cl.
*G06K 9/28* (2006.01)
*G06V 40/13* (2022.01)
*H04M 1/02* (2006.01)

(52) U.S. Cl.
CPC ...... *G06V 40/1306* (2022.01); *H04M 1/0266* (2013.01)

(58) Field of Classification Search
CPC .......... G06K 9/0002; G06K 9/00006–9/0012; H04M 1/0266
See application file for complete search history.

(56) References Cited

U.S. PATENT DOCUMENTS 9,551,783 B2 1/2017 Schneider et al.
10,090,876 B1 10/2018 Matsuyuki et al.
(Continued)

FOREIGN PATENT DOCUMENTS

EP 3 557 372 10/2019
JP 2013156556 8/2013
(Continued)

OTHER PUBLICATIONS

Jiang et al, "Monolithic ultrasound fingerprint sensor", Microsystems & Nanoengineering, Published: Nov. 20, 2017, pp. 1-27. (Year: 2017).*

(Continued)

*Primary Examiner* — Brian Werner
(74) *Attorney, Agent, or Firm* — The Farrell Law Firm, P.C.

(57) ABSTRACT

Disclosed is an electronic device that includes a housing, a display module that includes a first panel including a first surface, a second surface opposite to the first surface, and a plurality of pixels disposed between the first surface and the second surface, a cover layer that is disposed on the first surface of the first panel and that forms one surface of the housing, and a second panel disposed on the second surface of the first panel, and a sensor that is coupled to the display module and that forms a sensing area on the one surface of the housing. The display module includes an opening that is formed through the second panel and in which the sensor is disposed, and the sensor includes an active area and an inactive area formed around the active area. A first adhesive material is formed between the active area and the first (Continued)

panel. The first adhesive material includes a mechanical or thermal characteristic that a glass transition temperature Tg ranges from 0° C. to 25° C. in a frequency condition of 0.01 Hz to 0.1 Hz, a modulus of elasticity at 35° C. or more is 0.2 GPa or less, and a modulus of elasticity at −10° C. or less is 1 GPa or more.

20 Claims, 11 Drawing Sheets

(56) References Cited

U.S. PATENT DOCUMENTS

| | | | |
|---|---|---|---|
| 2014/0355376 | A1 | 12/2014 | Schneider et al. |
| 2017/0372114 | A1* | 12/2017 | Cho .................. G06F 1/1626 |
| 2018/0151641 | A1 | 5/2018 | Choo et al. |
| 2018/0341290 | A1 | 11/2018 | Sim et al. |
| 2018/0373913 | A1 | 12/2018 | Panchawagh et al. |
| 2019/0087630 | A1* | 3/2019 | Seo .................. G06K 9/00053 |
| 2019/0088594 | A1 | 3/2019 | Ikeda et al. |
| 2019/0251325 | A1 | 8/2019 | Park et al. |
| 2019/0325188 | A1 | 10/2019 | Jo et al. |
| 2020/0057902 | A1 | 2/2020 | Kim et al. |
| 2020/0065542 | A1 | 2/2020 | Jin et al. |
| 2020/0160018 | A1* | 5/2020 | Panchawagh ....... H01L 41/0825 |

FOREIGN PATENT DOCUMENTS

| | | |
|---|---|---|
| KR | 100278594 | 1/2001 |
| KR | 1020180059720 | 6/2018 |
| KR | 1020180130151 | 12/2018 |
| KR | 1020190048194 | 5/2019 |
| KR | 1020190098537 | 8/2019 |
| KR | 1020190143737 | 12/2019 |
| KR | 1020200004724 | 1/2020 |
| KR | 1020200022773 | 3/2020 |
| KR | 1020200034261 | 3/2020 |
| KR | 1020200099878 | 8/2020 |
| WO | WO 2018/190619 | 10/2018 |
| WO | WO 2019/088594 | 5/2019 |

OTHER PUBLICATIONS

Emerson and Cuming, "TRA-BOND F113SC", Technical Data Sheet, Mar. 2009, 2 pages. (Year: 2009).*
International Search Report dated Jun. 11, 2020 issued in counterpart application No. PCT/KR2020/002164, 3 pages.
European Search Report dated Jan. 25, 2022 issued in counterpart application No. 20756200.0-1216, 12 pages.

* cited by examiner

ELECTRONIC DEVICE INCLUDING DISPLAY MODULE INCLUDING SENSOR AND METHOD FOR MANUFACTURING THE DISPLAY MODULE

CROSS-REFERENCE TO RELATED APPLICATION(S)

This application is based on and claims priority under 35 U.S.C. § 119 to Korean Patent Application No. 10-2019-0019472, filed on Feb. 19, 2019, and Korean Patent Application No. 10-2019-0018070, filed on Feb. 15, 2019, in the Korean Intellectual Property Office, the disclosures of each of which are incorporated by reference herein in their entireties.

BACKGROUND

1. Field

The disclosure relates generally to an electronic device having a display module including a sensor and a method for manufacturing the display module, and more particularly, to an electronic device having a display module including a sensor that forms a sensing area that overlaps a screen display area.

2. Description of the Related Art

An electronic device may include a sensor that provides a fingerprint recognition function, which may be disposed on a lower side of a display area on the exterior of the electronic device, or may be disposed on a rear case of the electronic device. The electronic device may support a fingerprint authentication function, based on the sensor.

Such an electronic device may include an optical fingerprint sensor, but may not include a separate light source for fingerprint recognition. The electronic device may use a light source included in a display (e.g., a backlight unit (BLU), a light emitting diode (LED), or an organic light emitting diode (OLED)) as a light source for the fingerprint sensor.

Recently, studies have been conducted to increase the size of a screen of a portable electronic device due to an increase in the number of users that prefer a large screen. For example, attempts have been made to implement a large screen by locating a fingerprint sensor, which is disposed in a non-display area (e.g., a bezel area) of an electronic device, in a display area of a display and reducing or removing the non-display area.

An electronic device having a sensor disposed in a display area of a display may include an attachment structure including an adhesive film attached between the sensor and a panel of the display. The adhesive film may not ensure mechanical reliability for a drop impact. Furthermore, the attachment structure including the adhesive film may deteriorate the performance (e.g., the signal to noise ratio (SNR)) of the sensor because the ultrasonic impedance of an adhesive material is relatively very low, compared with that of the display or the sensor.

SUMMARY

Aspects of the disclosure are to address at least the above-mentioned problems and/or disadvantages and to provide at least the advantages described below. Accordingly, an aspect of the disclosure is to provide a display module including a display-sensor coupling structure for ensuring mechanical reliability while maintaining sensor performance, and an electronic device including the display module.

In accordance with an aspect of the disclosure, an electronic device includes a housing, a display module having a first panel including a first surface, a second surface opposite to the first surface, and a plurality of pixels disposed between the first surface and the second surface, a cover layer that is disposed on the first surface of the first panel and that forms one surface of the housing, and a second panel disposed on the second surface of the first panel, and a sensor that is coupled to the display module and that forms a sensing area on the one surface of the housing.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6A is a sectional view taken along line A-A' of FIG. 5, and FIG. 6B is a sectional view taken along line B-B' of FIG. 5.

With regard to the description of the drawings, identical or similar reference numerals may be used to refer to identical or similar components.

DETAILED DESCRIPTION

Hereinafter, various embodiments of the disclosure will be described with reference to the accompanying drawings. However, those of ordinary skill in the art will recognize that modification, equivalent, and/or alternative on the various embodiments described herein can be variously made without departing from the scope and spirit of the disclosure.

Figure 1:
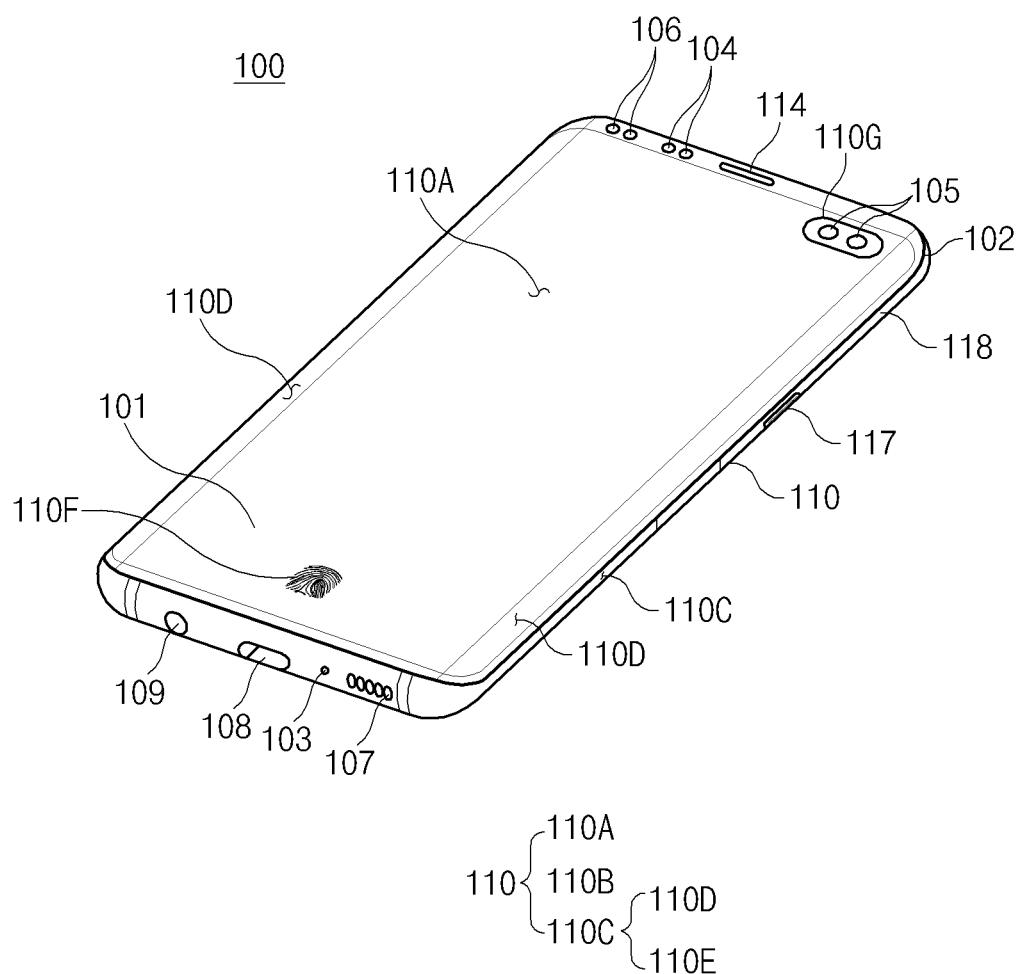
FIG. 1 is a front perspective view of an electronic device according to an embodiment.
Figure 2:
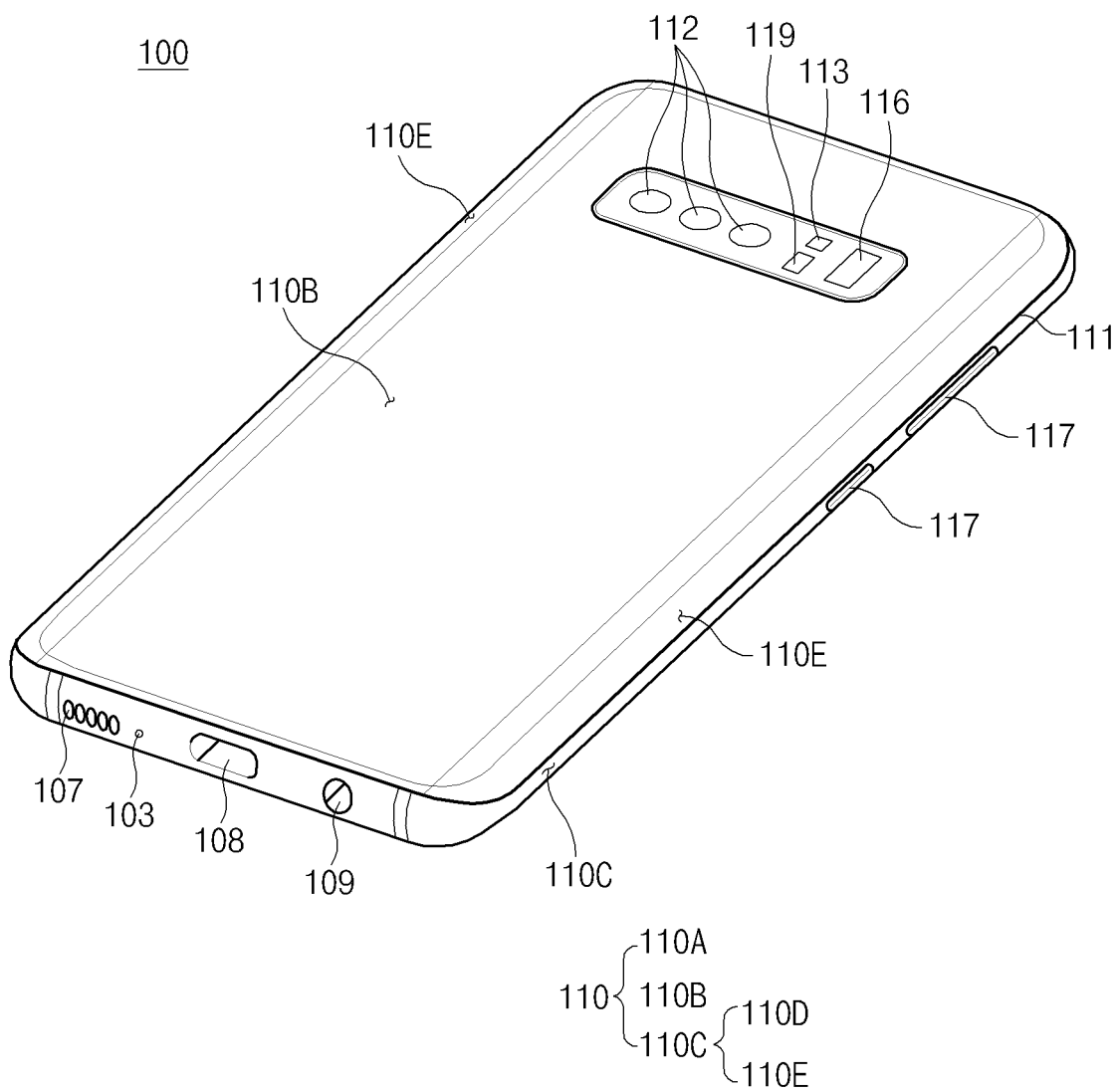
FIG. 2 is a rear perspective view of the electronic device illustrated in FIG. 1.

FIG. 1 is a front perspective view of an electronic device according to an embodiment. FIG. 2 is a rear perspective view of the electronic device illustrated in FIG. 1.

Referring to FIGS. 1 and 2, the electronic device 100 may include a housing 110 that includes a first surface (or a front surface) 110A, a second surface (or a rear surface) 110B, and side surfaces 110C that surround a space between the first surface 110A and the second surface 110B.

In another embodiment, the housing 110 may refer to a structure that forms some of the first surface 110A, the second surface 110B, and the side surfaces 110C of FIG. 1.

The first surface 110A may be formed by a front plate 102, at least a portion of which is substantially transparent (e.g., a glass plate or a polymer plate that includes various coating layers). The second surface 110B may be formed by a rear plate 111 that is substantially opaque. The rear plate 111 may be formed of, for example, coated or colored glass, ceramic, a polymer, metal (e.g., aluminum, stainless steel (STS), or magnesium), or a combination of at least two thereof. The side surfaces 110C may be formed by a side bezel structure (or a "side member") 118 that is coupled with the front plate 102 and the rear plate 111 and that contains metal and/or a polymer.

In some embodiments, the rear plate 111 and the side bezel structure 118 may be integrally formed with each other and may contain the same material (e.g., a metallic material such as aluminum).

As shown in FIGS. 1 and 2, the front plate 102 may include, at opposite long edges thereof, two first areas 110D that curvedly and seamlessly extend toward the rear plate 111 from the first surface 110A.

As shown in FIG. 2, the rear plate 111 may include, at opposite long edges thereof, two second areas 110E that curvedly and seamlessly extend toward the front plate 102 from the second surface 110B.

In some embodiments, the front plate 102 (or the rear plate 111) may include only one of the first areas 110D (or the second areas 110E). In another embodiment, the front plate 102 (or the rear plate 111) may not include a part of the first areas 110D (or the second areas 110E).

When viewed from a side of the electronic device 100, the side bezel structure 118 may have a first thickness (or width) at sides (e.g., short sides) not including the first areas 110D or the second areas 110E and may have a second thickness smaller than the first thickness at sides (e.g., long sides) including the first areas 110D or the second areas 110E.

The electronic device 100 may include at least one of a display 101, audio modules 103, 107, and 114, sensor modules 104, 116, and 119, camera modules 105, 112, and 113, key input devices 117, light emitting elements 106, and connector holes 108 and 109. In some embodiments, the electronic device 100 may omit at least one component (e.g., the key input devices 117 or the light emitting elements 106) among the components, or may additionally include other component(s).

The display 101 may be exposed through, for example, a large portion of the front plate 102. In some embodiments, at least a portion of the display 101 may be exposed through the front plate 102 that includes the first surface 110A and the first areas 110D of the side surfaces 110C.

The edge of the display 101 may be formed to be substantially the same as the shape of the adjacent periphery of the front plate 102. In another embodiment, the gap between the periphery of the display 101 and the periphery of the front plate 102 may be substantially constant to expand the area by which the display 101 is exposed.

A surface of the housing 110 (or the front plate 102) may include a screen display area that is formed as the display 101 is visually exposed. For example, the screen display area may include the first surface 110A and the first areas 110D of the side surfaces 110C.

As shown in FIGS. 1 and 2, the screen display area 110A and 110D may include a sensing area 110F configured to obtain biometric information of a user. Here, when the screen display area 110A and 110D includes the sensing area 110F, at least a portion of the sensing area 110F overlaps the screen display area 110A and 110D. In other words, the sensing area 110F may refer to an area for displaying visual information by the display 101 similarly to the other area of the screen display area 110A and 110D and additionally obtaining the user's biometric information (e.g., fingerprint).

The screen display area 110A and 110D of the display 101 may include an area 110G through which the first camera device 105 (e.g., a punch hole camera) is visually exposed. At least a portion of the edge of the area 110G, through which the first camera device 105 is exposed, may be surrounded by the screen display area 110A and 110D. In various embodiments, the first camera device 105 may include a plurality of camera devices.

In another embodiment, recesses or openings may be formed in portions of the screen display area 110A and 110D of the display 101, and the electronic device 100 may include at least one of the audio module 114, the first sensor module 104, and the light emitting elements 106 that are aligned with the recesses or the openings.

In another embodiment, the display 101 may include, on a rear surface of the screen display area 110A and 110D, at least one of the audio module 114, the sensor modules 104, 116, and 119, and the light emitting elements 106.

In another embodiment, the display 101 may be coupled with, or disposed adjacent to, touch detection circuitry, a pressure sensor for measuring the intensity (pressure) of a touch, and/or a digitizer for detecting a stylus pen of a magnetic type.

At least a part of the sensor modules 104, 116, and 119 and/or at least a part of the key input devices 117 may be disposed on the side surfaces 110C (e.g., the first areas 110D and/or the second areas 110E).

The audio modules 103, 107, and 114 may include the microphone hole 103 and the speaker holes 107 and 114. A microphone for obtaining a sound from the outside may be disposed in the microphone hole 103, and in some embodiments, a plurality of microphones may be disposed in the microphone hole 103 to sense the direction of a sound. The speaker holes 107 and 114 may include the external speaker hole 107 and the receiver hole 114 for a telephone call. The speaker holes 107 and 114 and the microphone hole 103 may be implemented with one hole, and a speaker (e.g., a piezoelectric speaker) may be included without the speaker holes 107 and 114.

The sensor modules 104, 116, and 119 may generate an electrical signal or a data value that corresponds to an operational state inside the electronic device 100 or an environmental state outside the electronic device 100. For example, the sensor modules 104, 116, and 119 may include the first sensor module 104 (e.g., a proximity sensor) that is disposed on the first surface 110A of the housing 110, the second sensor module 116 (e.g., a TOF camera device) that is disposed on the second surface 110B of the housing 110, the third sensor module 119 (e.g., a heart rate monitor (HRM) sensor) that is disposed on the second surface 110B of the housing 110, and/or the fourth sensor module (e.g., a sensor 190 of FIG. 3) (e.g., a fingerprint sensor) that is coupled to the display 101.

The TOF camera is configured to emit light (e.g., laser, infrared) to the object, receive the light reflected by the object, and calculate the distance to the object based on the time difference from transmission to reception. The TOF camera may provide distance (or depth) information in pixel units of the camera. The TOF camera may be utilized to recognize an object in three dimensions and collect real-time distance (or depth) information of the object.

The second sensor module 116 may include a TOF camera device for measuring distance.

At least a portion of the fourth sensor module (e.g., the sensor 190 of FIG. 3) may be disposed under the screen display area 110A and 110D. For example, the fourth sensor module may be disposed in a recess 139 that is formed on a rear surface of the display 101. That is, the fourth sensor module may not be exposed on the screen display area 110A and 110D and may form the sensing area 110F on at least part of the screen display area 110A and 110D.

The fingerprint sensor may be disposed not only on the first surface 110A of the housing 110 (e.g., the screen display area 110A and 110D) but also on the second surface 110B.

The electronic device 100 may further include a non-illustrated sensor module, which may be, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112, and 113 may include the first camera device 105 (e.g., a punch hole camera device) that is exposed through the first surface 110A of the electronic device 100, and the second camera device 112 and/or the flash 113 exposed through the second surface 110B.

As shown in FIG. 1, the first camera device 105 may be exposed through a portion of the screen display area 110D of the first surface 110A. For example, the first camera device 105 may be exposed on a partial area of the screen display area 110D through an opening formed in a portion of the display 101.

The second camera device 112 may include a plurality of camera devices (e.g., a dual camera and a triple camera). However, the second camera device 112 is not necessarily limited to including the plurality of camera devices. The second camera device 112 may include one camera device.

The camera devices 105 and 112 may include one or more lenses, an image sensor, and/or an image signal processor (ISP). The flash 113 may include, for example, a light emitting diode or a xenon lamp. In some embodiments, two or more lenses (an IR camera lens, a wide angle lens, and a telephoto lens) and image sensors may be disposed on one surface of the electronic device 100.

The key input devices 117 may be disposed on the side surfaces 110C of the housing 110. The electronic device 100 may not include all or some of the aforementioned key input devices 117, and the key input devices 117 not included may be implemented in different forms such as soft keys on the display 101. In some embodiments, the key input devices may include a sensor module (e.g., the sensor 190 of FIG. 3) that forms the sensing area 110F included in the screen display area 110A and 110D.

The light emitting elements 106 may be disposed on, for example, the first surface 110A of the housing 110. The light emitting elements 106 may provide, for example, state information of the electronic device 100 in the form of light. The light emitting elements 106 may provide, for example, a light source that operates in conjunction with the first camera device 105. The light emitting elements 106 may include, for example, an LED, an IR LED, and a xenon lamp.

The connector holes 108 and 109 may include the first connector hole 108 in which a connector (e.g., a USB connector) for transmitting and receiving power and/or data with an external electronic device is received, and/or the second connector hole 109 (e.g., an earphone jack) in which a connector for transmitting and receiving audio signals with an external electronic device is received.

Figure 3:
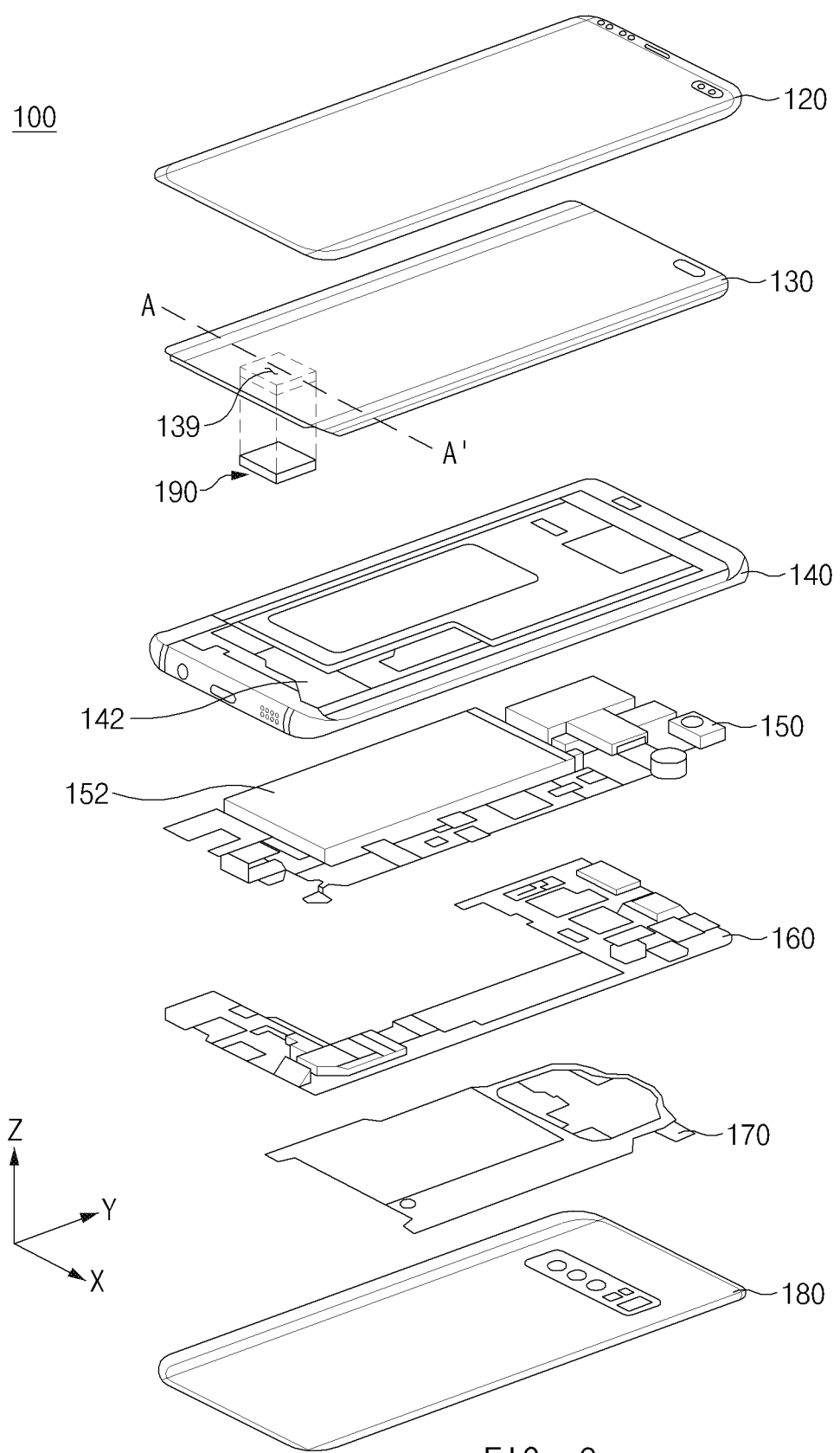
FIG. 3 is an exploded perspective view of the electronic device illustrated in FIG. 1.

FIG. 3 is an exploded perspective view of the electronic device illustrated in FIG. 1.

Referring to FIG. 3, the electronic device 100 may include a side member 140, a first support member 142 (e.g., a bracket), a front plate 120, a display 130 (e.g., the display 101 of FIG. 1), a printed circuit board (PCB) 150, a battery 152, a second support member 160 (e.g., a rear case), an antenna 170, and a rear plate 180. In some embodiments, the electronic device 100 may omit at least one component (e.g., the first support member 142 or the second support member 160) among the aforementioned components, or may additionally include other component(s). At least one of the components of the electronic device 100 may be the same as, or similar to, at least one of the components of the electronic device 100 of FIG. 1 or FIG. 2, and repetitive descriptions will be omitted.

The first support member 142 may be disposed in the electronic device 100 and may be connected with the side member 140, or may be integrally formed with the side member 140. The first support member 142 may be formed of, for example, a metallic material and/or a nonmetallic (e.g., polymer) material. The first support member 142 may have one surface to which the display 130 is coupled and an opposite surface to which the PCB 150 is coupled. The PCB 150 may have a processor, a memory, and/or an interface mounted thereon. The processor may include one or more of, for example, a central processing unit (CPU), an application processor (AP), a graphic processing unit (GPU), an ISP, a sensor hub processor, or a communication processor (CP).

The memory may include, for example, a volatile memory or a nonvolatile memory.

The interface may include, for example, a high definition multimedia interface (HDMI), a universal serial bus (USB) interface, an SD card interface, and/or an audio interface. The interface, for example, may electrically or physically connect the electronic device 100 with an external electronic device and may include a USB connector, an SD card/MMC connector, or an audio connector.

The battery 152 may be a device for supplying power to at least one component of the electronic device 100 and may include, for example, a primary cell that is not rechargeable, a secondary cell that is rechargeable, or a fuel cell. For example, at least a portion of the battery 152 may be disposed on substantially the same plane as the PCB 150. The battery 152 may be integrally disposed in the electronic device 100 and may be disposed so as to be detachable from the electronic device 100.

The antenna 170 may be disposed between the rear plate 180 and the battery 152. The antenna 170 may include, for example, a near field communication (NFC) antenna, a wireless charging antenna, and/or a magnetic secure transmission (MST) antenna. For example, the antenna 170 may perform short range communication with an external device, or may wirelessly transmit and receive power required for charging. In another embodiment, an antenna structure may be formed by the side member 140 and/or a portion of the first support member 142, or a combination thereof.

Referring to FIG. 3, the electronic device 100 may further include the sensor 190 coupled to the display 130. The sensor 190 may be disposed in the recess 139 (e.g., an opening 225 of FIG. 4) that is formed on a rear surface of the display 130. The sensor 190 may form a sensing area 110F on a portion of the front plate 120.

Figure 4:
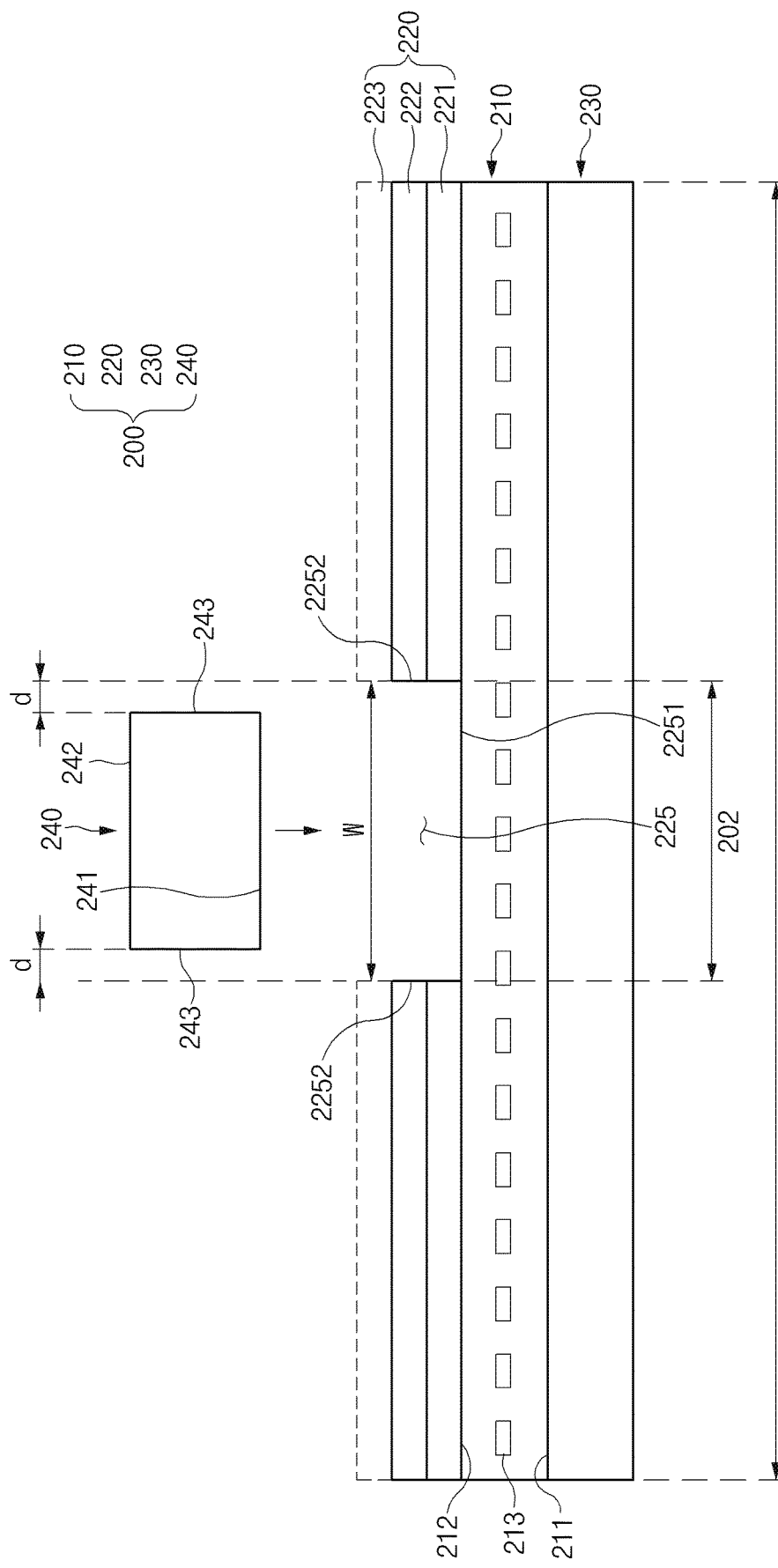
FIG. 4 is a sectional view of a display of the electronic device according to an embodiment.

FIG. 4 is a sectional view of a display module 200 of the electronic device 100, taken along line A-A' illustrated in FIG. 3, according to an embodiment.

Hereinafter, the display module 200 disclosed herein may be understood as including a display 210, 220, and 230 and a sensor 240.

The display module 200 may include the first panel 210 including a plurality of pixels 213, the cover layer 230 disposed on a first surface 211 of the first panel 210 (e.g., +Z-axis direction), the second panel 220 disposed on a second surface 212 of the first panel 210 (e.g., −Z-axis direction), and the sensor 240 coupled to the first panel 210. The first panel 210 may be disposed between the second panel 220 and the cover layer 230.

The first panel 210 may include the first surface 211 facing a first direction (e.g., +Z-axis direction) and the second surface 212 facing a second direction (e.g., −Z-axis direction) that is opposite to the first direction. For example, the first direction may be a direction toward the front surface of the electronic device 100 (e.g., a direction toward the first plate 120 in FIG. 3), and the second direction may be a direction toward the rear surface of the electronic device 100 (e.g., a direction toward the second plate 180 in FIG. 3).

The cover layer 230 may form at least a portion of a first plate 120 or may form a surface of the electronic device 100, or at least a portion of the cover layer 230 may form a first surface 100A of a housing 110.

The cover layer 230 may be formed to be transparent, and may contain a transparent material. In various embodiments, the cover layer 230 may be formed of various materials. For example, the cover layer 230 may be formed of a material such as glass, polyimide, or the like.

A screen display area 201 may be formed on the cover layer 230 by the first panel 210 disposed on the cover layer 230 in the second direction (e.g., −Z-axis direction). Furthermore, a sensing area 202 may be formed on the cover layer 230 by the sensor 240. For example, the sensing area 202 and at least a portion of the screen display area 201 may overlap each other.

The sensor 240 may transmit and receive a signal (e.g., an optical signal or an ultrasonic signal). The signal may travel from the sensor 240 toward a part of a user's body (e.g., a fingerprint) through the sensing area 202, and the signal reflected by the part of the user's body may travel back to the sensor 240 through the sensing area 202.

The first panel 210 may include a pixel layer containing the plurality of pixels 213. The pixel layer may form the screen display area 201 on the first plate 120 (or the front surface of the electronic device 100). In some embodiments, the first panel 210 may include a touch layer that contains a plurality of touch sensors.

The second panel 220 may include a cushion layer 221 for supporting the first panel 210 and a shielding layer 222 for shielding noise of the display module 200 from other electric elements (e.g., electric elements disposed on a printed circuit board). According to an embodiment, the shielding layer 222 may be a copper (Cu) sheet.

The cushion layer 221 may include layers for buffering impacts applied to the first panel 210. For example, the cushion layer 221 may include an EMBO layer. The EMBO layer disclosed in this disclosure may refer to a layer having an embossing pattern formed on a surface thereof. The cushion layer 221 may contain a cushioning material for absorbing impacts.

In some embodiments, the second panel 220 may further include a heat dissipation layer 223 for dissipating heat of the display module 200. The heat dissipation layer 223 may contain a graphite material.

Although the second panel 220 in FIG. 4 is illustrated as including the cushion layer 221 disposed on the first panel 210, the shielding layer 222 disposed on the cushion layer 221, and the heat dissipation layer 223 disposed on the shielding layer 222, the second panel 220 is not necessarily limited thereto. For example, the layers 221, 222, and 223 of the second panel 220 disclosed herein may be stacked differently than as shown in FIG. 4, or the second panel 220 may further include an additional layer, or may not include some of the layers 221, 222, and 223.

The display module 200 may include the opening 225 formed through the second panel 220, such that the second surface 212 of the first panel 210 is exposed when viewed in the second direction (e.g., −Z-axis direction). The sensor 240 may be disposed in the opening 225. The opening 225 may be formed to be larger than the sensor 240 such that inner walls 2252 of the opening 225 are spaced apart from side surfaces 243 of the sensor 240 by a predetermined gap "d".

The opening 225 may include a bottom surface 2251 and the inner walls 2252 facing each other. The bottom surface 2251 may include a portion of the second surface 212 of the first panel 210. The inner walls 2252 may include end surfaces of the plurality of layers (e.g., 221, 222, and 223) that are included in the second panel 220.

The sensor 240 may include a first surface 241 disposed to face the first panel 210, a second surface 242 opposite to the first surface 241, and the side surfaces 243 formed between the first surface 241 and the second surface 242.

The sensor 240 may be inserted into the opening 225 such that the first surface 241 is attached to the bottom surface 2251 of the opening 225 and the side surfaces 243 are spaced apart from the inner walls 2252 of the opening 225 by the predetermined gap "d".

Hereinafter, the sensor 240 disclosed in various embodiments of the disclosure may include an ultrasonic sensor. The ultrasonic sensor may be configured to obtain the user's biometric information (e.g., the structure of a fingerprint) by using ultrasonic waves having a predetermined frequency. The resolving power of the ultrasonic sensor may be improved more as the frequency of the ultrasonic waves becomes higher.

In various embodiments, the ultrasonic sensor may obtain biometric information of the user by transmitting ultrasonic waves toward a part of the user's body that is adjacent to (e.g., brought into contact with) the sensing area 202 that is formed on the cover layer 230 and receiving the ultrasonic waves reflected from the part of the user's body. For example, the sensor 240 may be an ultrasonic fingerprint sensor for obtaining fingerprint information of the user, and the biometric information may be the structure of a fingerprint of the user.

Figure 5:
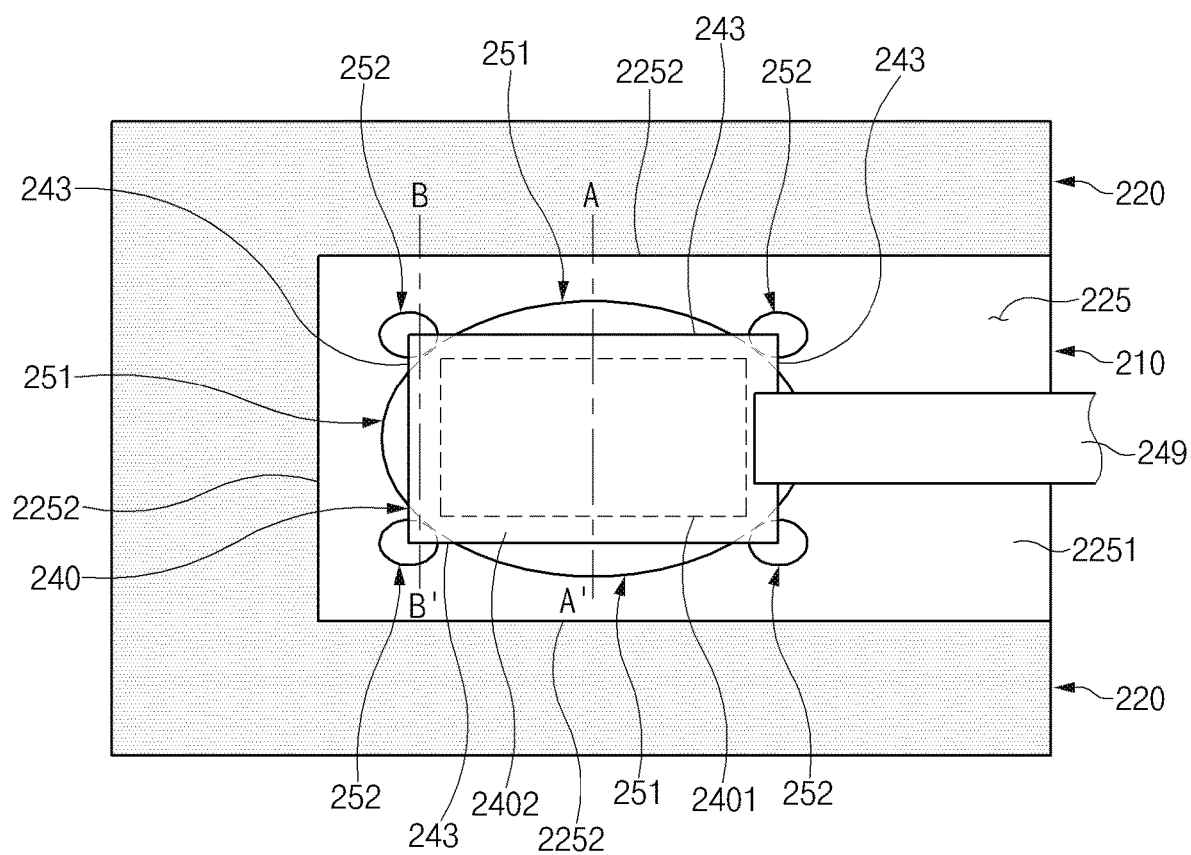
FIG. 5 illustrates a coupling structure of a sensor of the electronic device according to an embodiment.

FIG. 5 illustrates a coupling structure of the sensor 240 of the electronic device 100 according to an embodiment.

The sensor 240 may include an active area 2401 for obtaining biometric information of the user and an inactive area 2402 formed around the active area 2401. The sensor 240 may include, under the active area 2401, a component (e.g., an ultrasonic transmission/reception module) that is directly related to a sensing function. The inactive area 2402 may be, for example, an area where components related to semiconductor packaging (e.g., a connecting terminal) are disposed.

The electronic device 100 may include a first adhesive area 251 containing a first adhesive material and one or more second adhesive areas 252 containing a second adhesive material.

In various embodiments, the first adhesive area 251 may be formed between the sensor 240 and the bottom surface 2251 of the opening 225 (e.g., the second surface 212 of the first panel 210). The first adhesive area 251 may be formed to be wider than the active area 2401 to substantially cover the entire active area 2401. That is, the first adhesive area 251 may be formed to correspond to the entire active area 2401 and a portion of the inactive area 2402. The first adhesive area 251 may be formed by applying the first adhesive material to the bottom surface 2251 of the opening 225 (e.g., the second surface 212 of the first panel 210) and then curing the first adhesive material.

The first adhesive area 251 may be formed on the active area 2401 and may extend from the active area 2401 to an area around the active area 2401. For example, a portion of the first adhesive area 251 may cover a portion of the inactive area 2402, and the first adhesive area 251 may extend to a partial area of the bottom surface 2251 of the opening 225 that does not correspond to the sensor 240 (e.g., an area around the inactive area 2402).

In various embodiments, each of the second adhesive areas 252 may be formed on a portion of the inactive area 2402 of the sensor 240. The second adhesive area 252 may be formed by applying the second adhesive material to the portion of the inactive area 2402 and then curing the second adhesive material.

The second adhesive area 252 may be formed on a portion of the remaining area other than the first adhesive area 251 so as not to make contact with the first adhesive area 251. For example, the second adhesive material applied to the second adhesive area 252 and the first adhesive material applied to the first adhesive area 251 may not be mixed with each other.

At least a portion of the second adhesive area 252 may be formed between the inactive area 2402 of the sensor 240 and the bottom surface 2251 of the opening 225 (e.g., the second surface 212 of the first panel 210), and the remaining portion of the second adhesive area 252 may be formed around the inactive area 2402. The second adhesive area 252 may be formed by applying the second adhesive material to the bottom surface 2251 of the opening 225 and then curing the second adhesive material.

The second adhesive area 252 may be formed on a portion of the inactive area 2402 and may extend to an area around the inactive area 2402. For example, a portion of the second adhesive area 252 may cover a portion of the inactive area 2402, and the second adhesive area 252 may extend to a partial area of the bottom surface 2251 of the opening 225 that does not correspond to the sensor 240 (e.g., an area around the inactive area 2402).

In various embodiments, the second adhesive area 252 may be formed at a vertex formed by the bottom surface 2251 and two side surfaces 243 connected with each other among the plurality of side surfaces 243 of the sensor 240.

For example, the sensor 240 may have a rectangular parallelepiped shape, and the second adhesive areas 252 may be formed to contain a plurality of vertexes adjacent to the bottom surface 2251 among the vertexes of the rectangular parallelepiped. The second adhesive material may be applied between the plurality of vertexes and the bottom surface 2251.

In various embodiments, the second adhesive material that forms the second adhesive areas 252 may include an ultraviolet (UV) curable material (e.g., a UV bond) that is cured by irradiating UV light.

The second adhesive areas 252 may temporarily fix the sensor 240 to the bottom surface 2251 of the opening 225 before a bubble removal process of removing bubbles from the first adhesive material contained in the first adhesive area 251.

In some embodiments, the sensor 240 may include a central area covered by the first adhesive material and a peripheral area on which the second adhesive material is formed. In this case, the central area may substantially correspond to the active area 2401, and the peripheral area may substantially correspond to the inactive area 2402.

The sensor 240 may be electrically connected to a processor of the electronic device 100 through a connecting member 249. The connecting member 249 may extend from the interior of the opening 225 to the outside. For example, the connecting member 249 may include a flexible PCB (FPCB).

Figure 6A:
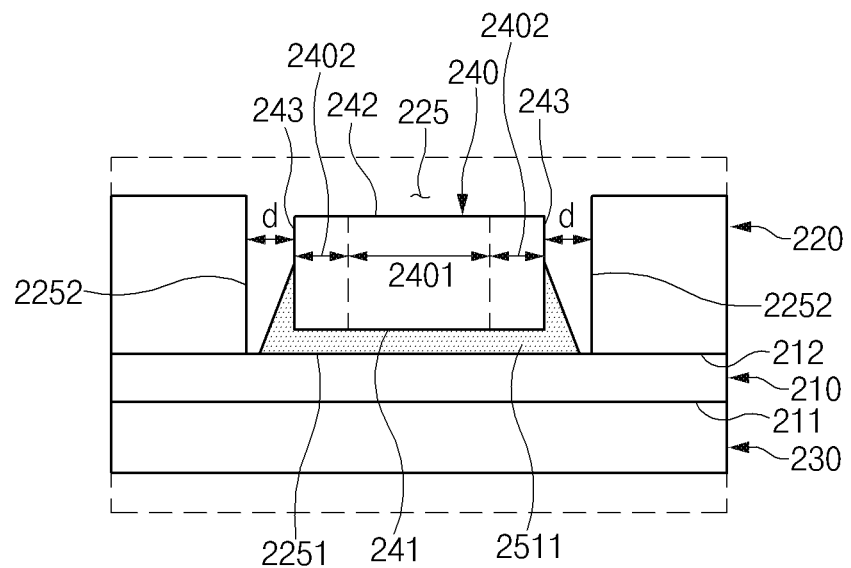
FIGS. 6A and 6B illustrate the coupling structure of the sensor of the electronic device according to an embodiment.
Figure 6B:
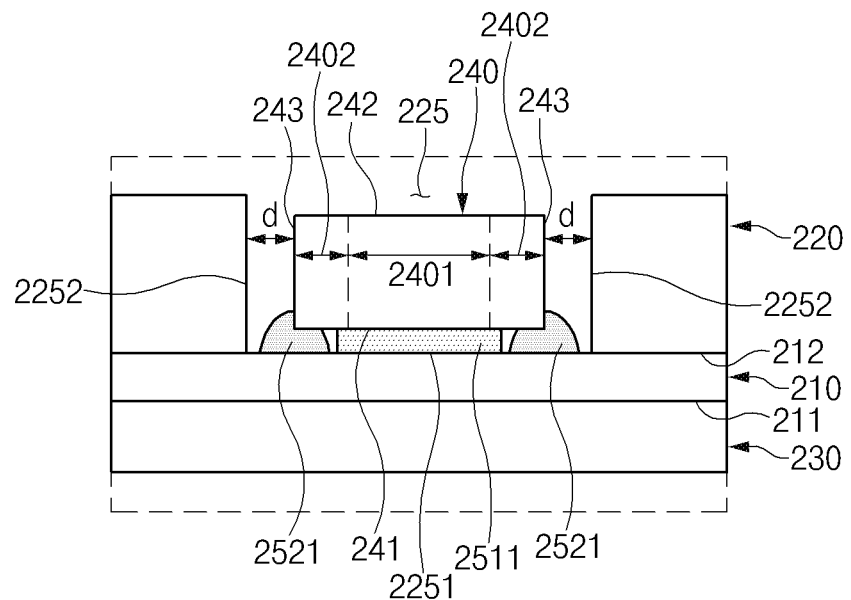

FIG. 6A is a sectional view taken along line A-A' of FIG. 5. FIG. 6B is a sectional view taken along line B-B' of FIG. 5. Referring to FIGS. 6A and 6B, the sensor 240 may be coupled with the display module 200 by a first adhesive material 2511 and a second adhesive material 2521.

Referring to FIG. 6A, the first surface 241 of the sensor 240 may be attached to the second surface 212 of the first panel 210 by the first adhesive material 2511. The first adhesive material 2511 may be formed in the opening 225.

Referring to FIG. 6A, the first adhesive material 2511 may be formed between the sensor 240 and the first panel 210. The first adhesive material 2511 may be formed between the active area 2401 and the first panel 210 to cover the entire active area 2401 of the sensor 240. A portion of the first adhesive material 2511 may be formed between the inactive area 2402 and the first panel 210 and may extend to an area around the inactive area 2402 (e.g., a partial area of the bottom surface 2251 of the opening 225 where the sensor 240 is not disposed).

To increase the adhesive force between the sensor 240 and the second surface 212 of the first panel 210, the first adhesive material 2511 may be formed to cover an area around the inactive area 2402 (e.g., a partial area of the bottom surface 2251 of the opening 225 where the sensor 240 is not disposed) and at least a portion of each side surface 243 of the sensor 240.

The first conductive material 2511 may include a liquid adhesive material. The first panel 210 may have fine raised parts on a surface thereof (e.g., the second surface 212). The liquid adhesive material may be applied between the raised parts to make the surface of the first panel 210 a substantially flat surface. For example, the liquid adhesive material may lower the surface roughness. Accordingly, the accuracy of ultrasonic waves transmitted and received from the ultrasonic sensor may be improved.

Referring to FIG. 6B, the sensor 240 may be attached to the bottom surface 2251 of the opening 225 by the first adhesive material 2511. At least a portion of the first adhesive material 2511 may be formed between the active area 2401 of the sensor 240 and the first panel 210, and another portion may be formed between the inactive area 2402 of the sensor 240 and the first panel 210.

In FIG. 6B, the sensor 240 may be attached to the bottom surface 2251 of the opening 225 (e.g., the second surface 212 of the first panel 210) by the second adhesive material 2521. The second adhesive material 2521 may be formed in the opening 225. The second adhesive material 2521 may be formed between the inactive area 2402 of the sensor 240 and the first panel 210. A portion of the second adhesive material 2521 may be formed between the inactive area 2402 and the first panel 210, and another portion may extend to an area around the inactive area 2402 (e.g., a partial area of the bottom surface 2251 of the opening 225 where the sensor 240 is not disposed).

The first adhesive material 2511 and the second adhesive material 2521 may be spaced apart from each other by a predetermined gap. Accordingly, the first adhesive material 2511 and the second adhesive material 2521 may be prevented from being mixed with each other. As a result, the physical properties thereof may be prevented from being changed, and the performance of the sensor 240 may be prevented from being deteriorated. The second adhesive material 2521 may be formed to cover an area around the inactive area 2402 (e.g., a partial area of the bottom surface 2251 of the opening 225 where the sensor 240 is not disposed) and at least a portion of each side surface 243 of the sensor 240.

The second adhesive material 2521 may include a UV curable resin that is cured by being exposed to UV light.

Figure 7:
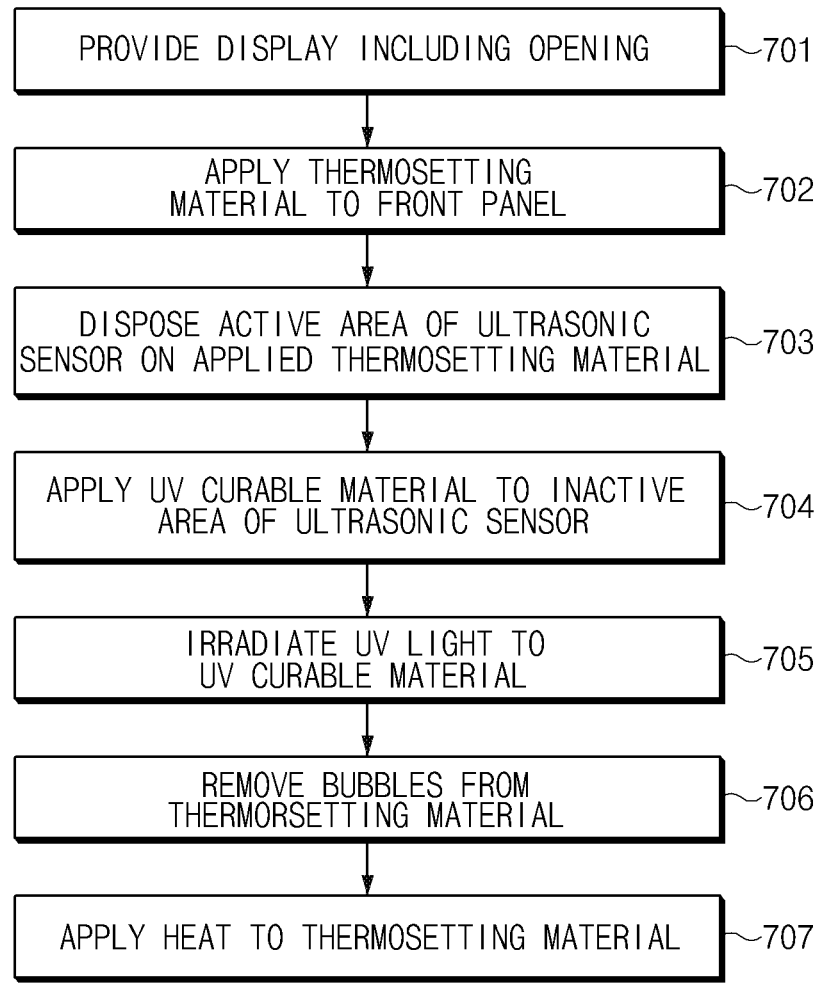
FIG. 7 is a flowchart illustrating a method for manufacturing a display module according to an embodiment.

FIG. 7 is a flowchart illustrating a method for manufacturing a display module according to an embodiment.

In accordance with the method for manufacturing the display module, in step 701, a display (e.g., the first panel 210, the second panel 220, and the cover layer 230) that includes an opening 225 is provided. In step 702, a thermosetting material (e.g., the first adhesive material 2511) is applied to the opening. In step 703, an active area 2401 of an ultrasonic sensor 240 is disposed on the applied thermosetting material. In step 704, a UV curable material is applied to an inactive area 2402 of the ultrasonic sensor. In operation 705, UV light is irradiated to the applied UV curable material (e.g., the second adhesive material 2521). In step 706, bubbles contained in the thermosetting material are removed. In step 707, heat is applied to the thermosetting material.

In step 701, the provided display may include a front panel 210 that includes a first surface including a screen display area 201 and a second surface opposite to the first surface, a rear panel 220 that is disposed on the second surface of the front panel, and an opening 225 that is formed through the rear panel. A first portion of the second surface of the front panel may be exposed through the opening.

In step 702, the thermosetting material (e.g., the first adhesive material 2511) may be applied to at least part of the first portion (e.g., the bottom surface 2251 of the opening 225).

In step 703, the ultrasonic sensor (e.g., the sensor 240) may be attached to the applied thermosetting material (e.g., the first adhesive area 251). The applied thermosetting material may be an uncured liquid material. The ultrasonic sensor may include the active area 2401 that includes a receiver for receiving ultrasonic waves and the inactive area 2402 that is formed around the active area.

In various embodiments, step 703 of attaching the ultrasonic sensor (e.g., the sensor 240) may include placing the ultrasonic sensor on the applied liquid thermosetting material and pressing the ultrasonic sensor in the direction toward the front panel. When the ultrasonic sensor is pressed, the applied thermosetting material may be widely spread on the second surface of the front panel.

With regard to step 703, step 702 of applying the thermosetting material may include applying the thermosetting material such that the thermosetting material (e.g., the first adhesive material 2511) that is spread by pressing the ultrasonic sensor covers at least the entirety of the active area 2401 of the ultrasonic sensor 240.

In step 704, the UV curable material (e.g., the second adhesive material 2521) may be applied to the inactive area 2402 of the ultrasonic sensor 240.

Step 704 may include a step of applying the UV curable material such that the UV curable material does not make contact with the thermosetting material. For example, the thermosetting material may be spread to a portion of the inactive area by pressing the ultrasonic sensor. The UV curable material may be applied to another portion of the inactive area such that the UV curable material does not make contact with the thermosetting material.

Step 704 may further include a step of applying the UV curable material through the space between inner walls 2252 of the opening 225 and side surfaces 243 of the ultrasonic sensor.

Step 704 may include a step of injecting the UV curable material into the space between the inner walls of the opening and the side surfaces of the ultrasonic sensor by using an injection instrument.

In step 705, the UV light may be irradiated to cure the UV curable material. When the UV light is irradiated, the UV curable material may fix the inactive area 2402 of the ultrasonic sensor to the second surface 212 of the front panel 210. Because the ultrasonic sensor 240, in step 705, is temporarily fixed (e.g., fixed to the second adhesive area 252 of FIG. 5) by the UV curable material, the position of the ultrasonic sensor may be fixed even though the pressure in a pressurization chamber is increased.

In step 706, to remove the bubbles from the thermosetting material, the display may be loaded into the pressurization chamber, and the pressure in the pressurization chamber may be raised. As the pressure in the pressurization chamber is increased, the bubbles may be removed from the applied liquid thermosetting material (e.g., the first adhesive material 2511). Furthermore, the thermosetting material may be spread between the second surface 212 of the front panel (e.g., the first panel 210) and the active area 2401 of the ultrasonic sensor 240.

In step 706, the pressure in the pressurization chamber may be increased to 3 bar (=0.3 MPa) at room temperature and may be maintained for 5 minutes to 15 minutes, for example, for 10 minutes.

By the removal of the bubbles in step 706, a medium (e.g., the first adhesive material 2511 or the first adhesive area 251) through which ultrasonic waves pass may be formed to be uniform, and thus the accuracy of the ultrasonic sensor may be improved. In some embodiments, step 706 may include an autoclave process.

The method may further include a step of unloading the display from the pressurization chamber after step 706 and before step 707.

In step 707, heat may be applied to the display to cure the thermosetting material (e.g., the first adhesive material 2511). When the heat is applied, the thermosetting material may be cured, and the active area 2401 of the ultrasonic sensor 240 may be attached to the second surface 212 of the front panel (e.g., the first panel 210).

In step 707, the display may be maintained at a temperature of 60° C. to 80° C., for example, 70° C. and a pressure of 1 bar (=0.1 MPa) for 15 minutes to 25 minutes, for example, for 20 minutes.

Figure 8:
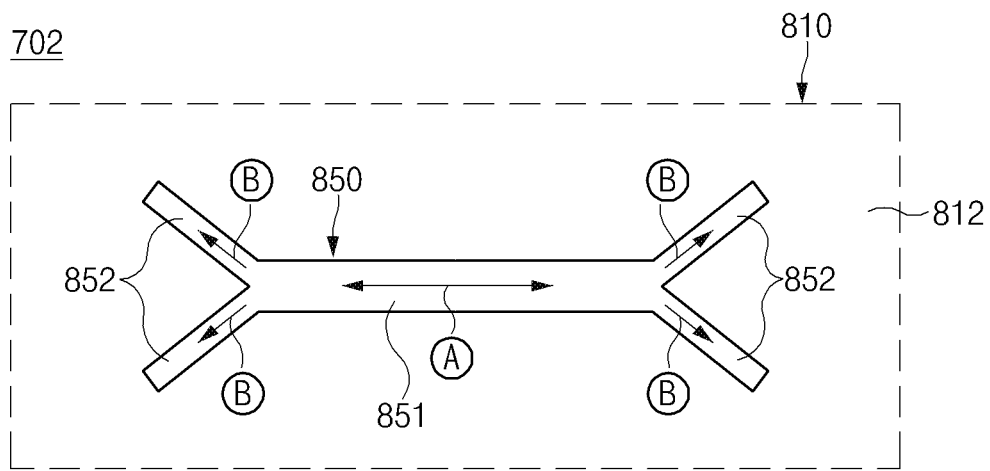
FIG. 8 illustrates an operation of applying a thermosetting material according to an embodiment.

FIG. 8 is a view illustrating a step of applying a thermosetting material according to an embodiment.

Referring to FIG. 8, in step 702 of FIG. 7, a thermosetting material 850 may be applied to a second surface 812 of a front panel 810 (e.g., the first panel 210) in a predetermined shape. The applied thermosetting material 850 may include a first portion 851 and second portions 852.

The thermosetting material 850 may be applied such that the first portion 851 extends in one direction (direction A). In some embodiments, the extension direction of the first portion 851 may correspond to the direction of long sides of an ultrasonic sensor 240.

The second portions 852 may be applied to extend from opposite ends of the first portion 851 in at least two directions (directions B). The second portions 852 may be applied to have a predetermined angle with respect to the extension direction of the first portion 851.

The thermosetting material 850 applied in the shape illustrated in FIG. 8 may be widely spread (e.g., the first adhesive area 251) on the second surface 812 of the front panel 810 in step 703 of attaching the ultrasonic sensor 240. The area (e.g., the first adhesive area 251) on which the thermosetting material 850 is spread may be spaced apart from the areas (e.g., the second adhesive areas 252) to which the UV curable material (e.g., the second adhesive material 2521) is applied in step 704. Accordingly, when the thermosetting material 850 is applied in the shape illustrated in FIG. 8, the thermosetting material 850 may not be mixed with the UV curable material applied later.

Figure 9:
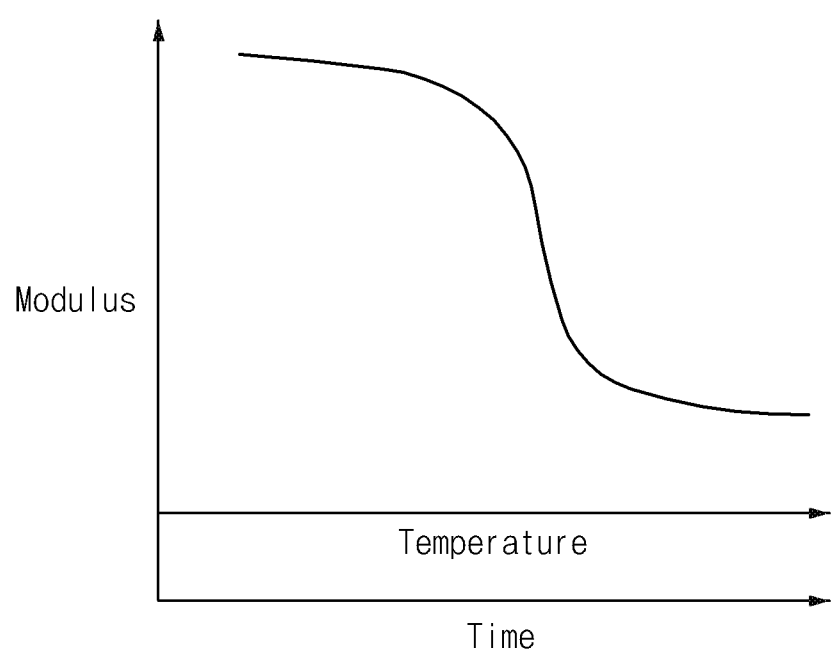
FIG. 9 illustrates a correlation between a mechanical property of a first adhesive material and temperature or time according to an embodiment.

FIG. 9 is a graph illustrating a correlation between a mechanical property of the first adhesive material and temperature or time according to an embodiment.

The first adhesive material 2511 that supports the coupling between the display module 200 and the sensor 240 may exhibit a low acoustic impedance characteristic when the mechanical property of the first adhesive material 2511 is low. In this case, an acoustic impedance difference may occur between the display module 200 or the sensor 240 and the first adhesive material 2511, and due to the acoustic impedance difference, the first adhesive material 2511 may exhibit poor performance as a medium for transferring a signal transmitted from the sensor 240. Alternatively, when the mechanical property of the first adhesive material 2511 is high, signal transmission performance may be relatively ensured due to a tiny acoustic impedance difference between the display module 200 or the sensor 240 and the first adhesive material 2511. However, internal or external stress of the first adhesive material 2511 generated during the coupling process may be transmitted to the display module 200 or the sensor 240 and may deform the exterior of the display, and the deformation may be viewed from the outside. Based on unique mechanical or thermal characteristics, the first adhesive material 2511 may satisfy conditions for which the high mechanical property and the low mechanical property are required.

In this regard, referring to FIG. 9, molecular motion of an organic compound (e.g., an epoxy resin) that the first adhesive material 2511 includes may be determined as a function of time and temperature that are converted into each other. For example, in the molecular motion of the organic compound, the behavior observed for a short period of time at high temperature is the same as the behavior observed for a long period of time at low temperature. Considering this, the first adhesive material 2511 may be manufactured to have a mechanical or thermal characteristic that the glass transition temperature Tg ranges from 0° C. to 25° C. in a specified frequency condition (e.g., 0.01 Hz to 0.1 Hz), a modulus of elasticity at 35° C. or more is 0.2 GPa or less, and a modulus of elasticity at −10° C. or less is 1 GPa or more. When the glass transition temperature of the first adhesive material 2511 in the specified frequency condition is 0° C. or less and the modulus of elasticity at −10° C. or less is less than 1 GPa, a rise in the mechanical property of the first adhesive material 2511 for a frequency rise may be insignificant, and therefore impedance in the ultrasonic band may be low. Alternatively, when the glass transition temperature of the first adhesive material 2511 in the specified frequency condition is 25° C. or more and the modulus of elasticity at 35° C. or more is more than 0.2 GPa, alleviation of internal or external stress of the first adhesive material 2511 generated in the process of coupling the display module 200 and the sensor 240 may be insignificant. Accordingly, the first adhesive material 2511, which includes the mechanical or thermal characteristic that the glass transition temperature Tg ranges from 0° C. to 25° C. in the specified frequency condition, the modulus of elasticity at 35° C. or more is 0.2 GPa or less, and the modulus of elasticity at −10° C. or less is 1 GPa or more, may have advantageous effects in which internal or external stress generated during the coupling process (e.g., a thermal-curing process at about 70° C.) is alleviated due to the low mechanical property and signal transmission performance in the ultrasonic band is improved due to the high mechanical property.

Figure 10:
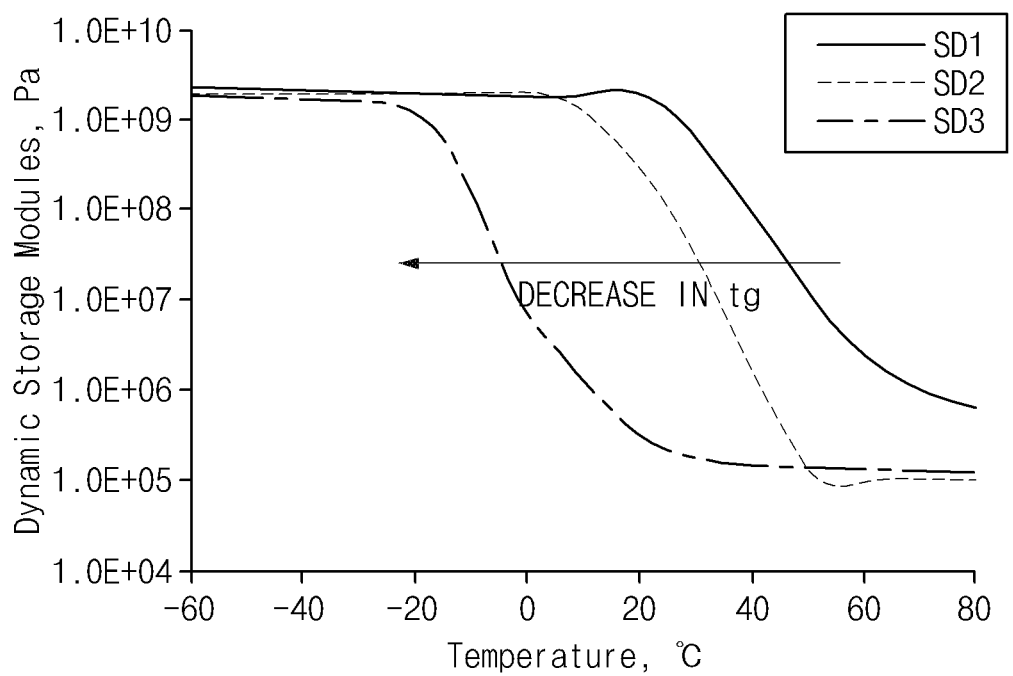
FIG. 10 illustrates a preparation example of the first adhesive material according to an embodiment.
Figure 11:
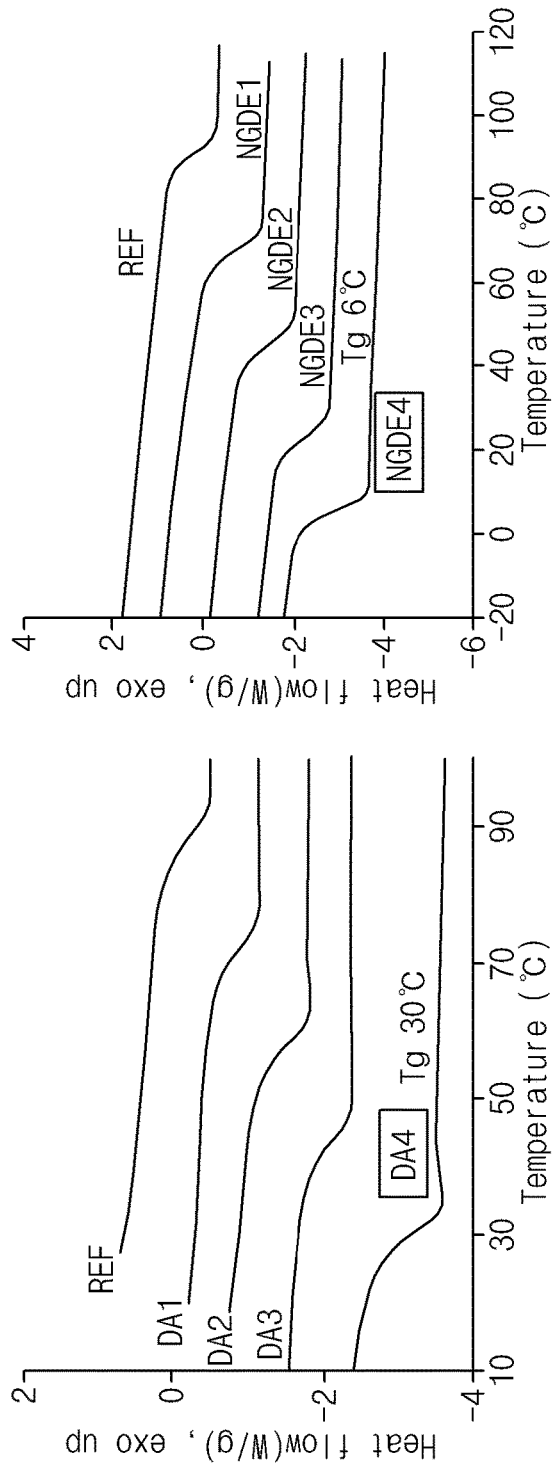
FIG. 11 illustrates a preparation example of the first adhesive material according to another embodiment.

FIG. 10 illustrates a preparation example of the first adhesive material according to an embodiment, and FIG. 11 illustrates a preparation example of the first adhesive material according to another embodiment.

Referring to FIG. 10, the first adhesive material 2511 may contain diglycidyl ether of bisphenol A and polyether amine such that the glass transition temperature of the first adhesive material 2511 ranges from 0° C. to 25° C., and the glass transition temperature of 0° C. to 25° C. may be implemented by adjusting the mixing ratio of the diglycidyl ether of bisphenol A and the polyether amine.

Referring to FIG. 11, the first adhesive material 2511 may contain diglycidyl ether of bisphenol A and poly(propylene glycol)bis(2-aminopropyl)ether, may contain neopentyl glycol diglycidyl ether and poly(propylene glycol)bis(2-aminopropyl)ether, or may contain 1,4-Butanediol diglycidyl ether (BDGE) and 1,6-Hexanediamine (HDMA). The combination of the compounds may result from the above-described mechanical or thermal characteristic of the first adhesive material 2511.

According to an embodiment, an electronic device includes a housing, a display module that includes a first panel including a first surface, a second surface opposite to the first surface, and a plurality of pixels disposed between the first surface and the second surface, a cover layer that is disposed on the first surface of the first panel and that forms one surface of the housing, and a second panel disposed on the second surface of the first panel, and a sensor that is coupled to the display module and that forms a sensing area on the one surface of the housing.

The display module may include an opening that is formed through the second panel and in which the sensor is disposed.

The sensor may include an active area and an inactive area formed around the active area.

According to an embodiment, a first adhesive material may be formed between the active area and the first panel. The first adhesive material may include a mechanical or thermal characteristic that a glass transition temperature Tg ranges from 0° C. to 25° C. in a frequency condition of 0.01 Hz to 0.1 Hz, a modulus of elasticity at 35° C. or more is 0.2 GPa or less, and a modulus of elasticity at −10° C. or less is 1 GPa or more.

The first adhesive material may include a material with a thermosetting property.

According to an embodiment, a second adhesive material different from the first adhesive material may be additionally formed between at least a portion of the inactive area and the first panel, and the second adhesive material may include a material with a UV curing property.

The sensor may include an ultrasonic sensor.

A portion of the first adhesive material may be formed between the inactive area and the first panel.

A portion of the first adhesive material may be formed outside an area of the first panel on which the sensor is disposed.

The sensor may include a first surface that faces the first panel, a second surface opposite to the first surface, and third surfaces formed between the first surface and the second surface, and the first adhesive material may be formed on the first surface and at least a portion of each of the third surfaces.

The first panel may form a screen display area on the one surface of the housing, and the screen display area may include the sensing area.

The second panel may include a shielding layer containing a metallic material and a cushion layer that absorbs an impact applied to the first panel.

The cushion layer may include a cushion layer containing a cushioning material.

The cushion layer may further include an EMBO layer having an embossing pattern formed thereon.

According to an embodiment, an electronic device includes a housing including a surface that includes a screen display area and a sensing area that overlaps the screen display area, a first panel that is disposed in the housing and that includes a first surface that faces the surface of the housing and a second surface opposite to the first surface, the first panel including a plurality of pixels that form the screen display area, a second panel disposed on the second surface of the first panel, an opening formed through the second panel, and a sensor that is disposed in the opening and coupled to the first panel and that forms the sensing area.

The sensor may include an ultrasonic sensor that senses biometric information of a user, based on ultrasonic waves passing through the sensing area.

The sensor may be attached to the first panel by a thermosetting material that includes a mechanical or thermal characteristic that a glass transition temperature Tg ranges from 0° C. to 25° C. in a frequency condition of 0.01 Hz to 0.1 Hz, a modulus of elasticity at 35° C. or more is 0.2 GPa or less, and a modulus of elasticity at −10° C. or less is 1 GPa or more.

The sensor may be attached to the first panel by the thermosetting material and a UV curable material.

The sensor may include an active area that forms the sensing area and an inactive area formed around the active area, at least a portion of the thermosetting material may be formed between the active area and the first panel, and the UV curable material may be formed between the inactive area and the first panel.

The sensor may include a first surface attached to the first panel, a second surface opposite to the first surface, and a plurality of side surfaces formed between the first surface and the second surface, and the UV curable material may be formed on a corner formed by at least two of the plurality of side surfaces of the sensor.

The second panel may include a shielding layer containing a metallic material, a pattern layer having an embossing pattern formed thereon, and a cushion layer containing a cushioning material.

According to an embodiment, a method for manufacturing a display module including a screen display area and a sensing area that overlaps the screen display area includes providing a display including an opening, in which the display includes a front panel that includes a first surface including the screen display area and a second surface opposite to the first surface, and a rear panel disposed on the second surface, and the opening is formed through the rear panel to expose a first portion of the second surface, applying a thermosetting resin to at least part of the first portion in the opening, in which the thermosetting material includes a mechanical or thermal characteristic that a glass transition temperature Tg ranges from 0° C. to 25° C. in a frequency condition of 0.01 Hz to 0.1 Hz, a modulus of elasticity at 35° C. or more is 0.2 GPa or less, and a modulus of elasticity at −10° C. or less is 1 GPa or more, attaching a sensor of an ultrasonic type to the thermosetting resin, injecting a UV curable adhesive between inner walls of the opening and the sensor, when the second surface is viewed from above, curing the UV curable adhesive by irradiating UV light to the UV curable adhesive, loading the display having the sensor attached thereto into a chamber and raising pressure in the chamber to remove bubbles from the thermosetting resin, and unloading the display from the chamber and thermally curing the thermosetting resin.

The thermosetting resin may include an epoxy resin.

The thermosetting resin may contain at least one of a combination of diglycidyl ether of bisphenol A and polyether amine, a combination diglycidyl ether of bisphenol A and poly(propylene glycol)bis(2-aminopropyl)ether, and a combination of neopentyl glycol diglycidyl ether and poly(propylene glycol)bis(2-aminopropyl)ether.

Injecting the UV curable adhesive between the inner walls of the opening and the sensor may include an operation of applying the UV curable adhesive such that the UV curable adhesive does not make contact with the thermosetting resin when the second surface of the front panel is viewed from above.

The sensor may not be separated from the panel in spite of an external impact applied to the display, and thus mechanical reliability may be ensured. In addition, a light source of the display to which the sensor is coupled, or the adhesive members by which the sensor is attached, may not affect sensor signals, and thus sensor performance may be maintained.

In addition, the disclosure may provide various effects that are directly or indirectly recognized.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
  a housing;
  a display module that includes a first panel including a first surface, a second surface opposite to the first surface, and a plurality of pixels disposed between the first surface and the second surface, a cover layer disposed on the first surface of the first panel and configured to form one surface of the housing, and a second panel disposed on the second surface of the first panel; and
  a sensor coupled to the display module and configured to form a sensing area on the one surface of the housing,
  wherein the display module includes an opening that is formed through the second panel and in which the sensor is disposed,
  wherein the sensor includes an active area and an inactive area formed around the active area,
  wherein a first adhesive material is formed between the active area and the first panel, and
  wherein a second adhesive material different from the first adhesive material is formed between at least a portion of the inactive area and the first panel.

2. The electronic device of claim 1, wherein the first adhesive material includes a mechanical or thermal characteristic that a glass transition temperature Tg ranges from 0° C. to 25° C. in a frequency condition of 0.01 Hz to 0.1 Hz, a modulus of elasticity at 35° C. or more is 0.2 GPa or less, and a modulus of elasticity at −10° C. or less is 1 GPa or more.

3. The electronic device of claim 1, wherein the first adhesive material includes a material with a thermosetting property.

4. The electronic device of claim 1, wherein the second adhesive material includes a material with a UV curing property.

5. The electronic device of claim 1, wherein the sensor includes an ultrasonic sensor.

6. The electronic device of claim 1, wherein a portion of the first adhesive material is formed between the inactive area and the first panel.

7. The electronic device of claim 1, wherein a portion of the first adhesive material is formed outside an area of the first panel on which the sensor is disposed.

8. The electronic device of claim 1, wherein the sensor includes a first surface configured to face the first panel, a second surface opposite to the first surface, and third surfaces formed between the first surface and the second surface, and wherein the first adhesive material is formed on the first surface and at least a portion of each of the third surfaces.

9. The electronic device of claim 1, wherein the first panel forms a screen display area on the one surface of the housing, and wherein the screen display area includes the sensing area.

10. The electronic device of claim 1, wherein the second panel includes:

a shielding layer containing a metallic material; and a cushion layer configured to absorb an impact applied to the first panel.

11. The electronic device of claim 10, wherein the cushion layer includes an embossing pattern formed thereon.

12. An electronic device comprising:

a housing including a surface that includes a screen display area and a sensing area configured to overlap the screen display area;

a first panel disposed on the housing, the first panel including a first surface configured to face the surface of the housing and a second surface opposite to the first surface, wherein the first panel includes a plurality of pixels configured to form the screen display area;

a second panel disposed on the second surface of the first panel;

an opening formed through the second panel; and a sensor disposed in the opening and coupled to the first panel, the sensor being configured to form the sensing area, wherein the sensor includes an ultrasonic sensor configured to sense biometric information of a user, based on ultrasonic waves passing through the sensing area, and wherein the sensor attached to the first panel by a first adhesive material and a second adhesive material that is different from the first adhesive material and that is spaced apart from the first adhesive material.

13. The electronic device of claim 12, wherein the first adhesive material includes a thermosetting material and the second adhesive material includes a UV curable material.

14. The electronic device of claim 13, wherein the sensor includes an active area configured to form the sensing area and an inactive area formed around the active area, wherein at least a portion of the thermosetting material is formed between the active area and the first panel, and wherein the UV curable material is formed between the inactive area and the first panel.

15. The electronic device of claim 13, wherein the sensor includes a first surface attached to the first panel, a second surface opposite to the first surface, and a plurality of side surfaces formed between the first surface and the second surface, and wherein the UV curable material is formed on a corner formed by at least two of the plurality of side surfaces of the sensor.

16. The electronic device of claim 12, wherein the second panel includes:

a shielding layer containing a metallic material;

a pattern layer having an embossing pattern formed thereon; and a cushion layer containing a cushioning material.

17. A method for manufacturing a display module including a screen display area and a sensing area configured to overlap the screen display area, the method comprising:

providing a display including an opening, wherein the display includes a front panel that includes a first surface including the screen display area and a second surface opposite to the first surface, and a rear panel disposed on the second surface, and the opening is formed through the rear panel to expose a first portion of the second surface;

applying a thermosetting resin to at least part of the first portion in the opening;

attaching a sensor of an ultrasonic type to the thermosetting resin;

injecting a UV curable adhesive between inner walls of the opening and the sensor, when the second surface is viewed from above;

curing the UV curable adhesive by irradiating UV light to the UV curable adhesive;

loading the display having the sensor attached thereto into a chamber and raising pressure in the chamber to remove bubbles from the thermosetting resin; and unloading the display from the chamber and thermally curing the thermosetting resin.

18. The method of claim 17, wherein the thermosetting resin includes an epoxy resin.

19. The method of claim 17, wherein the thermosetting resin includes a resin that is cured at 70° C. or less and that has an elastic modulus of 1 GPa or less and a shrinkage of 6% or less.

20. The method of claim 17, wherein injecting the UV curable adhesive between the inner walls of the opening and the sensor includes:

applying the UV curable adhesive such that the UV curable adhesive does not make contact with the thermosetting resin when the second surface of the front panel is viewed from above.

* * * * *